United States Patent
Fino et al.

(10) Patent No.: US 9,749,709 B2
(45) Date of Patent: Aug. 29, 2017

(54) AUDIO PREVIEW OF MUSIC

(75) Inventors: Jorge Fino, San Jose, CA (US);
Benjamin A. Rottler, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 846 days.

(21) Appl. No.: 12/729,717

(22) Filed: Mar. 23, 2010

(65) Prior Publication Data

US 2011/0234480 A1 Sep. 29, 2011

(51) Int. Cl.
*H04N 5/44* (2011.01)
*G06F 17/30* (2006.01)
*G06F 3/023* (2006.01)
*G11B 27/031* (2006.01)
*G06F 1/16* (2006.01)
*G06F 3/048* (2013.01)
*H04N 21/81* (2011.01)
*G11B 27/00* (2006.01)
*G11B 27/10* (2006.01)
(Continued)

(52) U.S. Cl.
CPC ....... *H04N 21/8113* (2013.01); *G11B 27/005* (2013.01); *G11B 27/105* (2013.01); *G11B 27/34* (2013.01); *H04N 21/41422* (2013.01); *H04N 21/458* (2013.01); *H04N 21/47217* (2013.01); *H04N 21/482* (2013.01)

(58) Field of Classification Search
CPC .......................... H04N 21/472; G06F 3/0482
USPC ......... 345/619, 473, 173; 348/595; 707/769; 709/228; 725/37, 52, 127, 29, 44, 92, 725/112; 386/201; 455/550.1; 381/80; 715/210, 730, 738; 713/2
See application file for complete search history.

(56) References Cited

U.S. PATENT DOCUMENTS 6,230,322 B1 5/2001 Saib et al.
6,232,539 B1 5/2001 Looney et al.
(Continued)

FOREIGN PATENT DOCUMENTS

KR 1999-0073234 10/1999
WO WO 2009/113021 9/2009

OTHER PUBLICATIONS

RestrictedFormatsMP3, "Playing MP3 Files" http://hlpe.ubuntu.com/community/RestrictedFormats/MP3?action=print, pp. 1-3, retrieved Dec. 12, 2008.
(Continued)

*Primary Examiner* — Lin Li
(74) *Attorney, Agent, or Firm* — Fish & Richardson P.C.

(57) ABSTRACT

Systems, methods, and machine-readable media are disclosed for providing an audio preview of songs and other audio elements. In some embodiments, an electronic device may operate in either a "play mode," which allows a user to listen to songs in a normal fashion, or in a "preview mode," which may be used to provide previews of songs to a user in succession. In some embodiments, the electronic device may seamlessly transition between play mode and preview mode. For example, the electronic device may pause a currently-playing song when the mode of operation switches from play mode to preview mode so that, if the user exits out of preview mode, the original song may be resumed from the pause point. In some embodiments, the electronic device may provide a multi-directional visual interface that allows a user to control the succession of previews provided in preview mode.

10 Claims, 10 Drawing Sheets

(51) Int. Cl.
    *G11B 27/34*     (2006.01)
    *H04N 21/414*     (2011.01)
    *H04N 21/458*     (2011.01)
    *H04N 21/472*     (2011.01)
    *H04N 21/482*     (2011.01)

(56) References Cited

U.S. PATENT DOCUMENTS

| | | |
|---|---|---|
| 6,421,305 B1 | 7/2002 | Gioscia et al. |
| 6,606,101 B1 | 8/2003 | Malamud et al. |
| 6,675,233 B1 | 1/2004 | Du et al. |
| 7,047,502 B2 | 5/2006 | Petropoulos et al. |
| 2001/0030660 A1 | 10/2001 | Zainoulline |
| 2004/0045034 A1* | 3/2004 | Moroo .......................... 725/112 |
| 2004/0221311 A1* | 11/2004 | Dow et al. ....................... 725/52 |
| 2005/0162559 A1* | 7/2005 | Schopper et al. ............. 348/595 |
| 2005/0210416 A1 | 9/2005 | MacLaurin et al. |
| 2006/0143566 A1* | 6/2006 | Tsai et al. ..................... 715/719 |
| 2006/0224260 A1 | 10/2006 | Hicken et al. |
| 2007/0061497 A1 | 3/2007 | Takatsuka |
| 2007/0126755 A1* | 6/2007 | Zhang et al. ................. 345/619 |
| 2007/0222768 A1* | 9/2007 | Geurts et al. ................. 345/173 |
| 2008/0022846 A1 | 1/2008 | Samadani et al. |
| 2008/0066102 A1* | 3/2008 | Abraham et al. ............... 725/37 |
| 2008/0066135 A1* | 3/2008 | Brodersen et al. ........... 725/134 |
| 2010/0016018 A1* | 1/2010 | Okuda et al. ............. 455/556.1 |
| 2011/0161348 A1* | 6/2011 | Oron ............................ 707/769 |

OTHER PUBLICATIONS

Ericsson Inc. "Cellular Phone With Integrated MP3 Player." Research Disclosure Journal No. 41815, Research Disclosue Database No. 418015 (Feb. 1999).
Menta, "1200 Song MP3 Portable is a Milestone Player." http://www.mp3newswire.net/stories/personaljuke.html (retrieved Jul. 17, 2010).
Creative NOMAD® Digital Audio Player User Guide.
Creative NOMAD® II Getting Started Guide.
Rio 500 Getting Started Guide.
Rio PMP300 User's Guide (1998).

* cited by examiner

AUDIO PREVIEW OF MUSIC

FIELD OF THE INVENTION

This is directed to an application for providing a preview of audio elements, such as songs.

BACKGROUND OF THE DISCLOSURE

Today's electronic devices, such as desktop computers and portable music players, are capable of storing a large amount of media. For example, users commonly maintain large collections of music on their electronic devices.

Because music collections may be expansive, locating a particular song from a music collection may be difficult. In particular, a user often has to devote his or her attention to navigating through sequences of menus and options in order to select a desired song. This can be frustrating to a user, particularly at times when the user cannot devote all of his or her attention to selecting music, such as when the user is operating a motor vehicle.

SUMMARY OF THE DISCLOSURE

Systems, methods, and machine-readable media (e.g., computer-readable media) are disclosed for providing an audio preview of music on an electronic device, such as a portable media player (e.g., Apple's iPhone or iPod). For simplicity, an audio preview of various songs provided in accordance with the principles of the invention may sometimes be referred to as a "scan preview." The scan preview may, among other things, allow users to browse a large number of songs or other media quickly, enable users to easily and effectively locate a particular song or other media from a large collection of media.

In some embodiments of the invention, a scan preview can involve successively playing portions of songs (or "snippets") from different categories or music groups. This way, a user can experience different types of songs to determine which type suits the user's current mood, for example. The different categories may be, for example, different genres, artists, albums, release dates, download dates, or song speeds (e.g., by beats per minute ("BPM")). The electronic device providing the scan preview may play a snippet of one song in a category before moving to the next category, or may play snippets from multiple songs (e.g., 2, 5, 10, or 25 songs) in the same category before moving to the next category.

In some embodiments, the electronic device may operate in a "scan preview mode" (or simply a "preview mode") when providing the user with a scan preview. The electronic device may seamlessly transition between the preview mode and a "normal mode," which allows a user to listen to music in a typical fashion (e.g., by creating a playlist of songs or by selecting a song from a list of songs), and back again. For example, the electronic device can pause an initial song that is playing in play mode responsive to receiving a user request to enter preview mode. This way, if the user chooses to exit the preview mode without choosing a new song to play in play mode, the electronic device can go back to the initial song by resuming the song from its pause point.

In some embodiments, the electronic device can provide a multi-directional interface that allows a user to control which previews are provided during a scan preview. For example, the "multi-directional interface" can refer to an interface of an electronic device that can receive horizontally-directed and vertically-directed user inputs to affect different aspects of the scan preview. Responsive to receiving a directional input in a horizontal direction, the electronic device may visually rotate the visual interface horizontally and may play a scan preview for songs associated with a different category (e.g., songs by Usher) in the same attribute (e.g., artists). Responsive to receiving a directional input in a vertical direction, the electronic device may visually rotate the visual interface vertically and may play a scan preview for songs associated with a category (e.g., hip hop) for a different attribute (e.g., genre). This way, the user can choose the way in which the user wants to search for a song (i.e., by using vertically-directed movements to change between searching by artist, genre, album, etc.), and can also move between categories to locate the specific song (e.g., by using horizontally-directed movements).

BRIEF DESCRIPTION OF THE DRAWINGS

The above and other aspects and advantages of the invention will be apparent upon consideration of the following detailed description, taken in conjunction with accompanying drawings, in which like reference characters refer to like parts throughout, and in which.

DETAILED DESCRIPTION

Systems, methods, and machine-readable media are provided for providing an audio preview (or "scan preview") of music.

Figure 1:
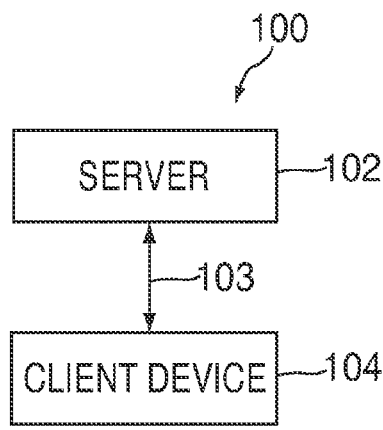
FIG. 1 is a schematic view of a client-server data system configured in accordance with an embodiment of the invention.

FIG. 1 is a schematic view of illustrative client-server data system 100 configured in accordance with the principles of the invention. Data system 100 can include server 102 and client device 104. In some embodiments, data system 100 can include multiple servers 102, multiple client devices 104, or both multiple servers 102 and multiple client devices 104. To prevent overcomplicating the drawing, only one server 102 and one client device 104 are illustrated.

Server 102 may include any suitable types of servers that can store and provide data to client device 104 (e.g., file server, database server, web server, or media server). Server 102 can store media and other data (e.g., metadata associated with the media), and server 102 can receive data download requests from client device 104. For example, server 102 can receive requests to obtain music, such as one or more songs. Responsive thereto, server 102 can locate and provide the requested songs as well as metadata associated with the songs (e.g., seed-generated information, genre, artist, album, album cover art, release date, BPM information).

In some embodiments, server 102 can obtain and process data from one or more client devices 104. For example, server 102 can collect information on playlists created by users of various client devices 104. Using the collected information, server 102 can determine which songs are commonly grouped or played with one another. Upon request by a particular client device 104, server 102 can use this information to create playlists from the songs stored on the particular client device 104 and can provide the created playlists to client device 104. This feature may sometimes be referred to as the "seed-based clustering" feature, and the music groups created by this feature may sometimes be referred to as seed-generated clusters, regardless of whether a seed is actually used to create the clusters. That is, it should be understood that server 102 can create playlists or music groups using any suitable technique, including but not limited to seeding each playlist or music group with an initial song.

Server 102 can communicate with client device 104 over communications link 103. Communications link 103 can include any suitable wired or wireless communications link, or combinations thereof, by which data may be exchanged between server 102 and client 104. For example, communications link 103 can include a satellite link, a fiber-optic link, a cable link, an Internet link, or any other suitable wired or wireless link. Communications link 103 may enable data transmission using any suitable communications protocol supported by the medium of communications link 103. Such communications protocols may include, for example, Wi-Fi (e.g., a 802.11 protocol), Ethernet, Bluetooth (registered trademark), radio frequency systems (e.g., 900 MHz, 2.4 GHz, and 5.6 GHz communication systems), infrared, TCP/IP (e.g., and the protocols used in each of the TCP/IP layers), HTTP, BitTorrent, FTP, RTP, RTSP, SSH, any other communications protocol, or any combination thereof.

Client device 104 can include any electronic device capable of playing audio (e.g., music, podcasts, interviews) to a user and may be operative to communicate with server 102. For example, client device 104 can include a portable media player (e.g., an iPod), a cellular telephone (e.g., an iPhone), pocket-sized personal computers, a personal digital assistance (PDA), a desktop computer, a laptop computer, and any other device capable of communicating via wires or wirelessly (with or without the aid of a wireless enabling accessory device).

Figure 2:
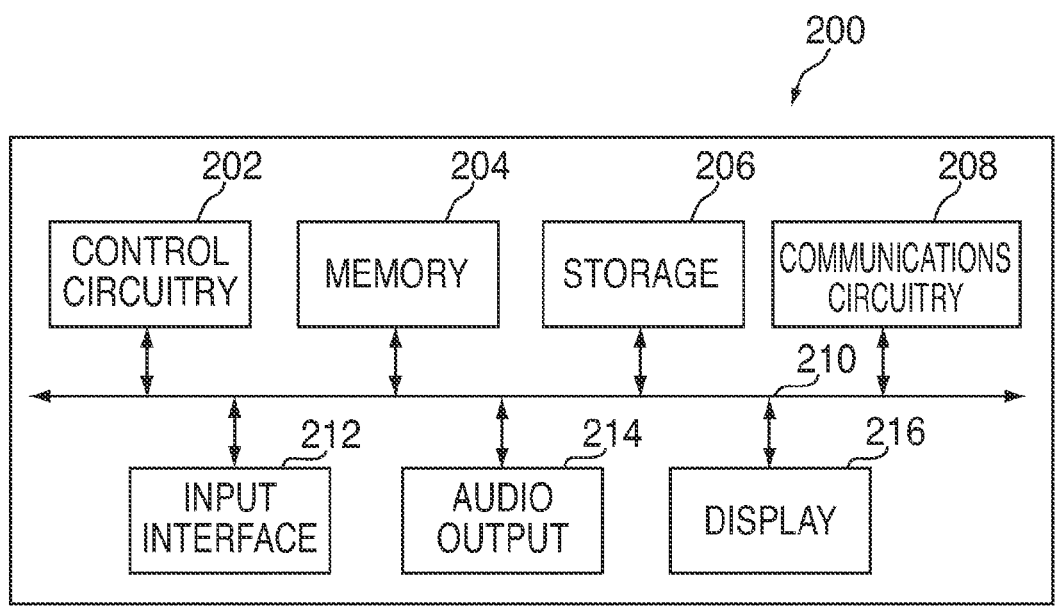
FIG. 2 is a schematic view of an electronic device configured in accordance with an embodiment of the invention.

Referring now to FIG. 2, a schematic view of illustrative electronic device 200 is shown. Electronic device 200 can be a device that is the same or similar to client device 104 (FIG. 1), or can be a device not operative to communicate with a server. Electronic device 200 can include control circuitry 202, memory 204, storage 206, communications circuitry 208, bus 210, input interface 212, audio output 214, and display 216. Electronic device 200 can include other components not shown in FIG. 2, such as a power supply for providing power to the components of electronic device. Also, while only one of each component is illustrated, electronic device 200 can include more than one of some or all of the components.

Control circuitry 202 can control the operation and various functions of device 200. For example, control circuitry 202 can identify songs to play to a user, and can direct audio output 214 to play the identified songs. As described in detail below, control circuitry 202 can control the components of electronic device 200 to provide a scan preview of music in accordance with the principles of the invention. Control circuitry 202 can include any components, circuitry, or logic operative to drive the functionality of electronic device 200. For example, control circuitry 202 can include one or more processors acting under the control of an application.

In some embodiments, the application can be stored in memory 204. Memory 204 can include cache memory, Flash memory, read only memory (ROM), random access memory (RAM), or any other suitable type of memory. In some embodiments, memory 204 can be dedicated specifically to storing firmware for control circuitry 202. For example, memory 204 can store firmware for device applications (e.g., operating system, scan preview functionality, user interface functions, and other processor functions).

Storage 206 can be any suitable type of storage medium offering permanent or semi-permanent memory. For example, storage 206 can include one or more storage mediums, including for example, a hard drive, Flash, or other EPROM or EEPROM. Storage 206 can be used by electronic device 200 to store music, such as a collection of songs, and other media. Storage 206 can store information or metadata associated with the media, such as user-generated or automatically-created playlists, seed-generated clusters and other music groupings, genre, artist, album, album cover art, date, BPM, or any other suitable information for each stored song. In some embodiments, the media and associated information can be obtained from a server, such as server 102 of FIG. 1. Storage 206 can also store any other suitable information, such as preference information (e.g., music playback preferences, scan preview preferences), lifestyle information, exercise information (e.g., obtained from exercise monitoring system), transaction information (e.g., credit card information), subscription information (e.g., for podcasts or television shows), and telephone information (e.g., an address book).

Bus 210 may provide a data transfer path for transferring data to, from, or between control circuitry 202, memory 204, storage 206, communications circuitry 208, and some or all of the other components of electronic device 200.

Communications circuitry 208 can enable electronic device 200 to communicate with other devices, such as to a server (e.g., server 102 of FIG. 1). For example, communications circuitry 208 can include Wi-Fi enabling circuitry that permits wireless communication according to one of the 802.11 standards or a private network. Other wired or wireless protocol standards, such as Bluetooth, can be used in addition or instead.

Input interface 212, audio output 214, and display 216 can provide a user interface for a user to interact with electronic device 200. Input interface 212 may enable a user to provide inputs and feedback to electronic device 200. Input interface 212 can take any of a variety of forms, such as one or more of a button, keypad, dial, click wheel, touch screen, or accelerometer. Audio output 214 provides an interface by which electronic device 200 can provide music and other audio elements to a user. Audio output 214 can include any type of speaker, such as computer speakers or headphones. Display 216 can present visual media (e.g., graphics such as album cover, text, and video) to the user. Display 216 can include, for example, a liquid crystal display (LCD), a touchscreen display, or any other type of display.

Electronic device 200 can provide a scan preview of various audio elements to a user. For simplicity, the embodiments of the invention will be described in terms of providing a scan preview of songs. However, this is not intended to be limiting, and it should be understood that the scan preview may be used with other types of audio elements and media elements, such as audio interviews, podcasts, videos, movie clips, or any other suitable browsable item. In some embodiments, the scan preview can provide an audible reading of a text-based document to, for example, provide accessibility options to a visually challenged user who may otherwise be unable to easily read the document. Accordingly, as used herein the term "play" can refer to playing an audio element or media element (e.g., playing audio and/or displaying video via an electronic device), can refer to playing an audio reading of a document, or can refer to playing any other suitable browsable item. Similarly, as used herein the term "preview" can refer to playing a portion (e.g., "snippet") of the browsable item.

A scan preview provided in accordance with the principles of the invention can involve playing portions, or snippets, of songs in succession to provide the user with a preview of each song. The songs selected for the scan preview may be from a variety of categories, such as songs in different genres, from different artists, from different albums, from different seed-generated clusters, released in different time periods, or downloaded by the user at different times or seasons. This way, the user can preview different types of music to determine which type is currently of interest.

Figure 3:
FIGS. 3-5 are illustrative display screens showing a scan preview of music provided in accordance with various embodiments of the invention.
Figure 4:
Figure 5:
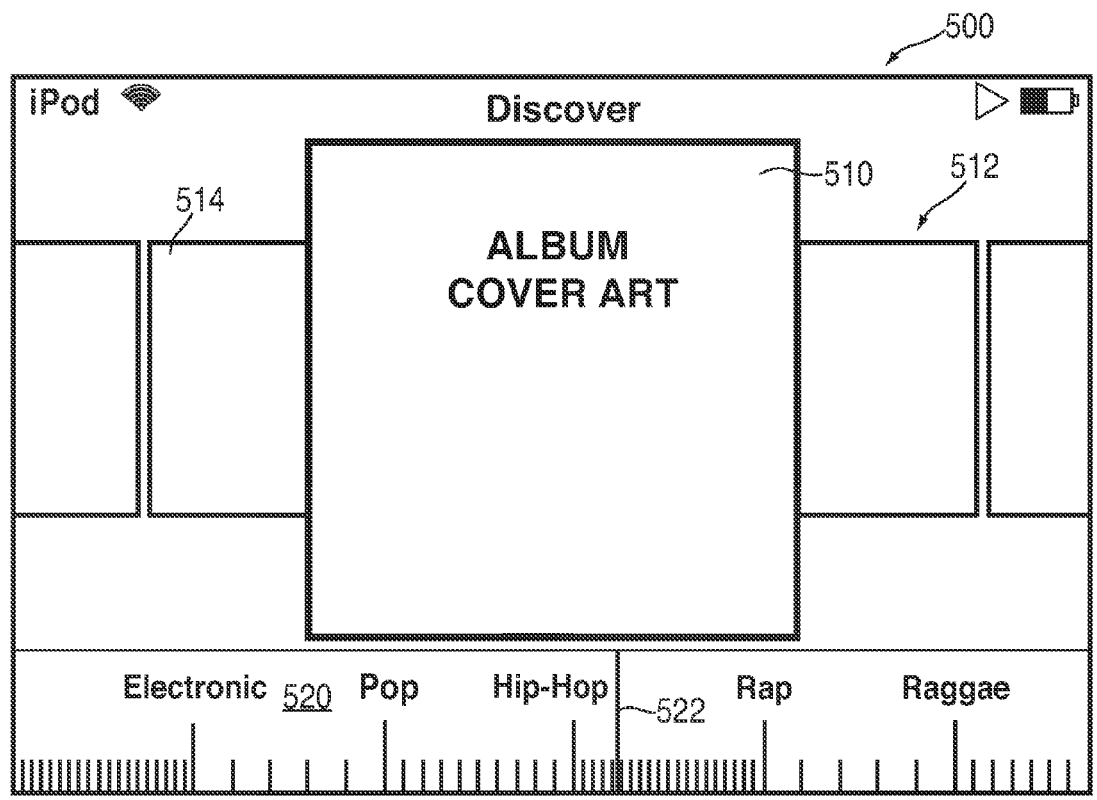

In some embodiments, electronic device 200 can allow the user to control the progression of the scan preview. For example, electronic device 200 may enable a user to control the length of time that each song snippet is played or to control which category of music to preview. FIGS. 3-5 show illustrative display screens that can be provided by various embodiments of electronic device 200. Accordingly, FIGS. 3-5 will be described with reference to electronic device 200 and its components.

Turning first to FIG. 3, illustrative display screen 300 is shown that can be provided by electronic device 200 during a user-controlled scan preview. More particularly, electronic device 200 may provide display screen 300 while playing one of the songs in the scan preview. In some embodiments, electronic device 200 can display album cover 310 for the album associated with the song currently being previewed. For example, if the current song in the scan preview is from hip-hop artist KanYe West's Graduation album, the cover art for Graduation can be displayed as album cover 310.

Electronic device 200 can provide a sliding bar 320 with pointer 322, which together provide additional information on the song being previewed. In particular, sliding bar 320 may be able to slide right or left with respect to pointer 322 such that pointer 322 can point to any of a number of positions along bar 320. Each of the positions on sliding bar 320 may be associated with a different category. In this embodiment, categories 324 may be different genres (e.g., pop, hip-hop, rap, electronic, reggae, country, blues, punk, grunge, and alternative). Positions 328, for example, can be associated with the hip-hop genre. In some embodiments, electronic device 328 might only display a subset of categories 324 at a given time due to, for example, size constraints on display screen 300.

At any given time, pointer 322 can point to a particular position along sliding bar 320. The position may be associated with the genre of the song currently being previewed. For example, while electronic device 200 plays a hip-hop song from KanYe West, pointer 322 may point to one of positions 328 associated with the hip-hop genre. Because the songs are organized along bar 320 based on genre, the scan preview illustrated in FIG. 3 may sometimes be referred to as a genre-based scan preview.

In some embodiments, pointer 322 may be at a fixed position on display screen 300 (e.g., centered), and sliding bar 320 may be controlled by a user using input interface 212 (FIG. 2). Responsive to a rightward user input, electronic device 200 may slide bar 320 towards the right so that pointer 322 points to another one of positions 328 closer to the rap genre. Responsive to a leftward user input, electronic device 200 may slide bar 320 towards the left so that pointer 322 points to another one of positions 328 closer to the pop genre. As bar 320 is moved, electronic device 200 may display additional categories 324 or genres that the user can scroll though. In some embodiments, if a user scrolls through all of the genres listed along bar 320, electronic device 200 can provide the same genres again as if bar 320 were circular.

The disclosed embodiments of the invention will sometimes be described in terms of moving or controlling pointer 322 instead of bar 320. This is merely to simplify the description of the disclosed embodiments. In some embodiments, electronic device 200 may fix the positions and genres on bar 320 and may allow a user to change the location of pointer 322 along bar 320.

In response to a user's request to move pointer 322 with respect to bar 320, electronic device 200 can select the next song to play in the scan preview. This next song may be in the same or in a different genre than the current song depending on the position of pointer 322. For example, as the user moves pointer 322 rightwards towards the rap genre, electronic device 320 may initially select hip-hop songs for the scan preview until pointer 322 passes into the area of bar 320 associated with rap songs, at which time electronic device 200 may select songs for the scan preview that are in the rap genre.

Each time a new song is selected by electronic device 200 for the scan preview, electronic device 200 can replace album cover 310 with the cover art associated with the new song's album. In addition, electronic device 200 can play a portion of this new song until, for example, a user input is received to reposition pointer 322. Thus, by moving pointer 322 slowly or quickly, or by starting or stopping its movement, a user can control the amount of time that each song is played in the scan preview. This can provide a similar effect as turning the knob of a radio dial. Also, by moving pointer 322 towards or away from particular genres, the user can control the category of songs being played in the scan preview.

Electronic device 200 may have a large number of songs in one or more of the genres. It may therefore be impractical to provide a preview of every song in a particular genre before pointer 322 is able to point to another genre. In some embodiments, electronic device 200 may assign a predetermined number or a maximum number of positions along bar 320 for each genre. For example, electronic device 200 can provide 10 positions for each genre—then, at most 10 songs can be previewed in one genre (e.g., hip-hop) before songs from another genre (e.g., rap) are selected. Electronic device 200 may use any suitable number other ten (e.g., 1, 5, 20, or 25).

In some embodiments, electronic device 200 may display a number of ticks 326 along bar 320, which may or may not be equivalent to the number of positions that pointer 322 can point to. The number of ticks 326 for each genre can indicate the number of songs available in that genre. In some embodiments, the genres can be spaced evenly along bar 320 and the density of ticks 326 can indicate the number of songs available in each genre. For example, in FIG. 3, electronic device 200 indicates using ticks 326 that more hip-hop songs are available on device 200 than pop or rap songs. This way, even if electronic device 200 provides the same number of snippets for each genre, a user is still able to visually distinguish between availability of songs from each genre. In other embodiments of the invention, ticks 326 may be evenly spaced instead of categories 326.

Because only a few of the songs in a particular genre may be selected for the scan preview in each rotation, electronic device 200 may need a mechanism for choosing which songs to preview. Electronic device 200 can select songs using any suitable approach. In some embodiments, electronic device 200 can select the songs randomly. As used herein, selecting an element "at random" or "randomly" refers to choosing an element that is not necessarily adjacent to the first element. The term is not intended to suggest pure randomness or even pseudo-randomness. For example, electronic device 200 can select any song in a same category, and not just the next song in the user's music library. A shuffle mode may be one example of a technique for randomly selecting songs. Accordingly, by selecting songs randomly, songs that are previewed back-to-back are less likely to be from the same artist or from the same album, and the user can sample a variety of songs in the same genre. In some embodiments, the songs in a genre can be selected according to a random shuffle mode, where the same song is not selected until all other songs in the same genre have been selected. In these embodiments, electronic device 200 may provide previews of different songs not only while pointer 322 scans through a particular genre a first time, but also in subsequent scans through that genre (e.g., when the user circles through all of the other genres and eventually returns to this genre).

Electronic device 200 can play any suitable portion of a selected song as an audio preview. For example, electronic device 200 can start the preview at the beginning of the song. In other embodiments, electronic device 200 may start the preview at its most famous part, at the chorus of the song, or at a part most representative of the overall song or of the feeling/mood of the song. The information indicating where to begin the preview may be a time stamp, and may be part of the metadata associated with the song. In some embodiments, electronic device 200 may receive the time stamp from a server, such as server 102 (FIG. 1).

Electronic device 200 can be operative to receive a user selection of a song in the scan preview. For example, electronic device 200 may interpret a user input from input interface 212 during the preview of a particular song as a selection of that particular song. Electronic device 200 can take a variety of different actions responsive to a user selection of a song. For example, electronic device 200 can use the selected song to generate a playlist of similar or related songs. To create the playlist, in some embodiments, electronic device 200 can select songs from the same genre as the selected song (since bar 320 is organized by genre), or electronic device 200 can use the selected song as a seed to create a seed-generated cluster of songs that are related or go well together.

In other embodiments, responsive to the user selection of a song, electronic device 200 can provide a menu of options related to the selected song (e.g., a menu with songs in the same genre, from the same artist, or from the same album as the selected song). In still other embodiments, electronic device 200 can filter songs stored on electronic device 200 by the genre of the selected song, and can enable the user to further filter the remaining songs by another attribute. For example, responsive to the user selection of a song from the genre-based scan preview of FIG. 3, electronic device 200 can provide an artist-based scan preview to enable a user to filter songs in the selected genre by artist.

FIG. 4 shows electronic device 200 providing illustrative display screen 400 as part of an artist-based scan preview. The artist-based scan preview may have any of the features or functionalities described above in connection with the genre-based scan preview, except that categories 424 are organized based on artist instead of genre. More particularly, electronic device 200 may display individual letters in alphabetical order along sliding bar 420. The individual letters may be used to order artists by name. For example, in FIG. 4, pointer 422 may point to a position associated with the letter J, and electronic device 200 may provide a preview of a song from John Legend (or from another artist whose first or last name begins with the letter J). A user can then control the position of pointer 422 with respect to sliding bar 420 to obtain previews of songs from different artists.

As described above, in some embodiments, electronic device 200 may provide an artist-based scan preview responsive to a user selection from a genre-based scan preview. For example, electronic device 200 may provide display screen 400 (with album cover art for a John Legend album) in response to a user selection of an R&B song by John Legend while pointer 322 (FIG. 3) is pointing to the R&B genre. In these embodiments, the artist-based scan preview may allow the user to preview songs in the R&B genre and to select a previewed song from an R&B artist. The electronic device may take any suitable action responsive to the user selection of the song, such as creating a playlist of R&B songs from that artist. By allowing the user to filter songs using multiple criteria (e.g., genre and artist), the user can locate one or more songs of particular interest, or can fully define the type of songs suitable for the user's current mood. This form of multi-level or multi-attribute scan preview may sometimes be referred to as a hierarchical scan preview.

FIGS. 3 and 4 show electronic device 200 providing a genre-based and artist-based scan preview, respectively. In other embodiments of the invention, an electronic device 200 may provide a scan preview that organizes the songs into categories based on another music attribute, such as based on a seed-generated cluster, album, release date, date downloaded, song speed (e.g., BPM), etc. Also, in some embodiments, the electronic device may provide a hierarchical scan preview using attributes other than or in addition to by genre and then by artist.

Referring now to FIG. 5, illustrative display screen 500 of a genre-based scan preview is provided in accordance with another embodiment of the invention. In some embodiments, electronic device 200 (FIG. 2) may provide display screen 500 during a genre-based scan preview instead of display screen 300 (FIG. 3). In other embodiments, electronic device 200 may provide display screen 500 while electronic device 200 is held in a landscape orientation and may provide display screen 300 while electronic device 200 is held in a portrait orientation.

Display screen 500 may have any of the features and functionalities of display screen 300 described above in connection with FIG. 3. For example, display screen 500 can include sliding bar 520, which can move with respect to stationary pointer 522 responsive to a user input, for providing the user with control over the progression of the genre-based scan preview. Also, display screen 500 can include album cover 510 corresponding to the song currently being previewed. Album cover 510 can be displayed in the foreground and in a central position. Electronic device 200 can display additional album covers 512 (including album cover 514) in the background, such as in a manner that allows foreground album covers 512 to appear far away compared to background album covers 512.

Background album covers 512 may be associated with potentially upcoming songs in the scan preview. For example, responsive to a user input to move pointer 522 left one position, electronic device 200 may change the song being played in the scan preview from a hip-hop song associated with album cover 510 to a different hip-hop song associated with album cover 514 (immediately to the left of album cover 510). Visually, album covers 510 and 512 may each shift left one position such that album cover 514 replaces album cover 510 as the cover art displayed in the prominent foreground position, and a new album cover is shifted into the leftmost position. Electronic device 200 may respond similarly to a user input to move pointer 522 to the right.

Electronic device 200 may provide a visual preview of potential upcoming songs in the scan preview using any suitable technique, including but not limited to the foreground/background technique shown in FIG. 5. For example, in some embodiments, electronic device 200 may display album covers 512 in an arrangement referred to sometimes as cover flow. In other words, album covers 510 and 512 may be displayed to emulate the flipping mechanism of a jukebox.

FIGS. 3-5 show illustrative display screens that may be provided during a user-controllable scan preview in accordance with various embodiments of the invention. The pointer in each of these described embodiments may be controlled using input interface 212, which as described above, may take on any of a variety of different forms. For example, if input interface 212 includes a click wheel, electronic device 200 may interpret clockwise and counterclockwise inputs as requests to move the pointer, and a click as a user selection of previewed song. In other embodiments, input interface 212 may include a touchscreen, and electronic device 200 may interpret dragging motions as requests to move the pointer, and a tapping motion as a request to select a previewed song. In some embodiments, input interface 212 can include an accelerometer, and electronic device 200 can detect a clockwise or counterclockwise acceleration of electronic device 200 (e.g., achieved by tipping electronic device 200) as requests to move the pointer. Any combination of the above, or any other type of inputs, may used instead to control the scan preview.

It should be understood that display screens 300, 400, and 500 (FIGS. 3-5) are merely illustrative and that electronic device 200 (FIG. 2) may provide any other graphical representation. For example, in some embodiments, electronic device 200 may not display the album cover associated with the song being previewed. In other embodiments, the sliding bar may instead be omitted, and the user-controllable pointer can be overlaid over the album cover. In still other embodiments, a graphical representation other than a sliding bar and pointer can be used to provide and select the different available categories (e.g., a slider, a dial, pop down menu, checkboxes, or radio buttons).

It should also be understood that an electronic device configured in accordance with the invention does not need to provide any visual display or user control of the progression of a scan preview. For example, in some embodiments, an electronic device can play each song in a scan preview for a predetermined amount of time (e.g., 5 seconds, 10 seconds), where each successive song or group of songs are chosen from a different category (e.g., different seed-generated cluster, genre, artist, album, date released, date downloaded, BPM). An automatically-progressing scan preview may have any of the non-visual features described above in connection with FIGS. 3-5. Scan previews that progress automatically will be described in greater detail below in connection with FIGS. 9-11.

A scan preview provided in accordance with the principles of the invention can be initiated using any suitable approach. In some embodiments, a scan preview can be invoked without use of a display. For example, a scan preview can be initiated by pressing a particular button or set of buttons on the user device, or by taking a specific set of actions (e.g., by pressing a button and shaking the electronic device). While any type of scan preview may be initiated in this way, automatically-progressing scan previews may advantageously be initiated using this technique, because use of the display may be avoided throughout the scan preview.

Figure 6:
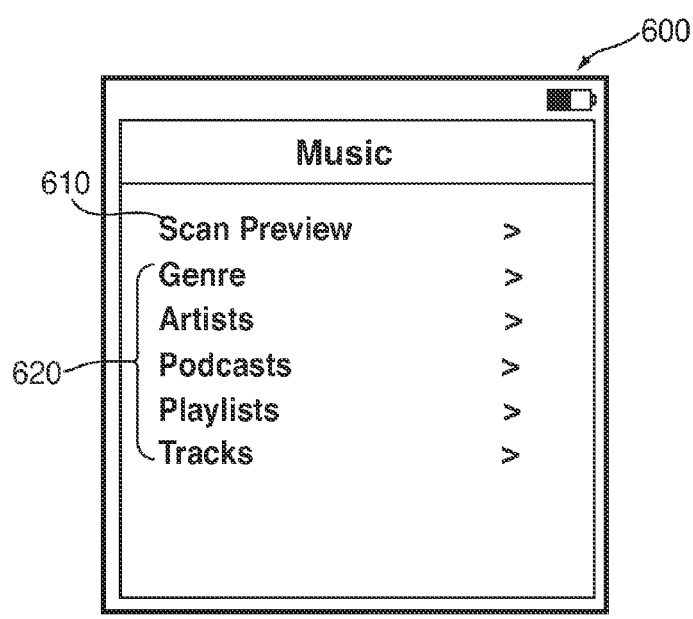
FIG. 6 shows an illustrative electronic device providing a user interface for initiating a scan preview of music configured in accordance with an embodiment of the invention.

In other embodiments, a scan preview may be initiated from a music menu displayed by an electronic device. FIG. 6 shows illustrative music main menu 800 that can be provided by an electronic device, such as electronic device 200 (FIG. 2). Music main menu 600 can include a list of options, such as option 610 to initiate a scan preview. Responsive to a user selection of scan preview option 610, electronic device 600 may provide any suitable type of scan preview (e.g., a hierarchical scan preview). In some embodiments, electronic device 600 can provide the user with an ability to initiate a scan preview from one or more music submenus. The submenus may be accessible from options 620. Initiating scan previews will be described in greater detail below in connection with FIG. 7.

Figure 7:
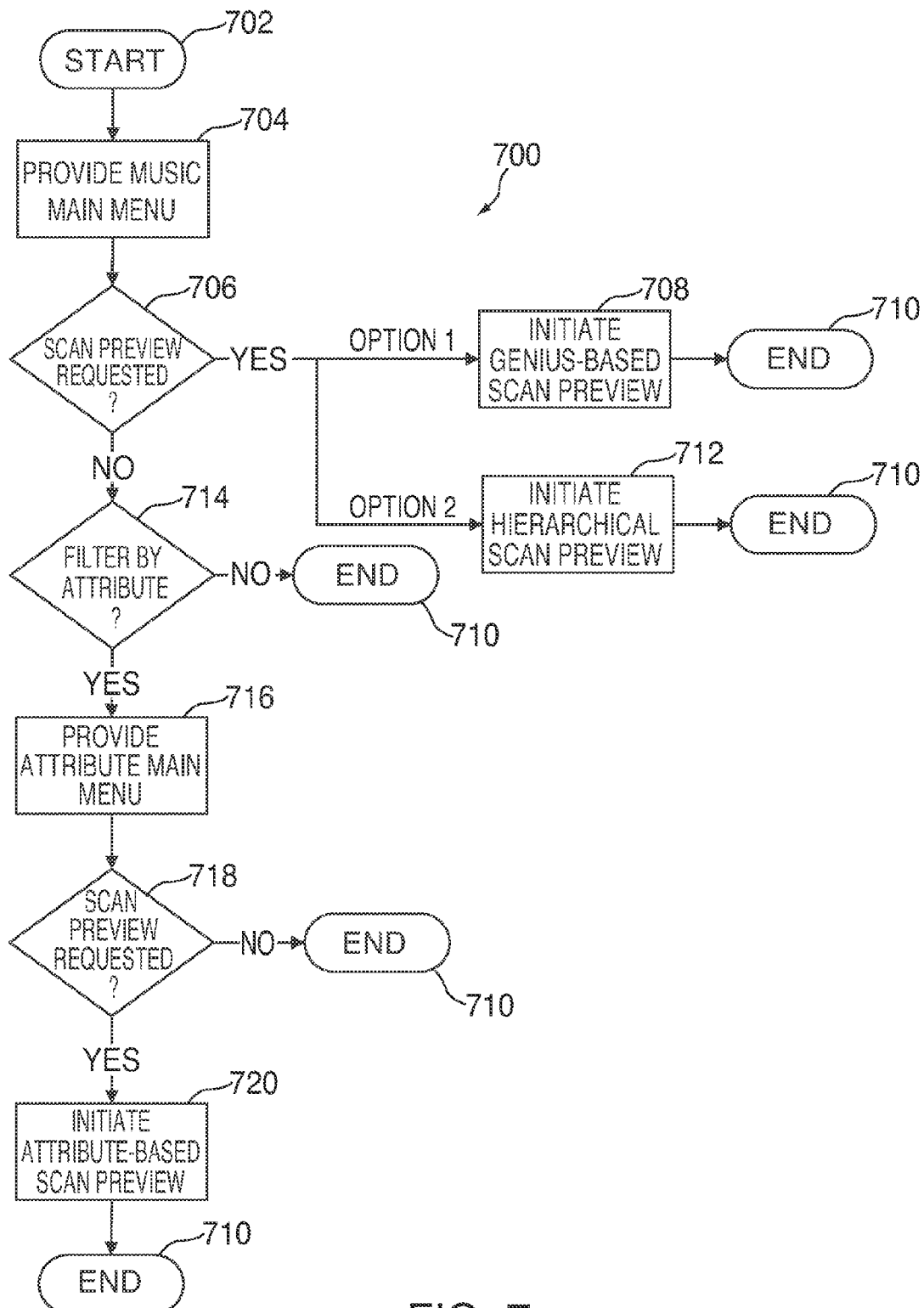
FIG. 7 is a flowchart of an illustrative process for initiating different types of scan previews in accordance with an embodiment of the invention.
Figure 8:
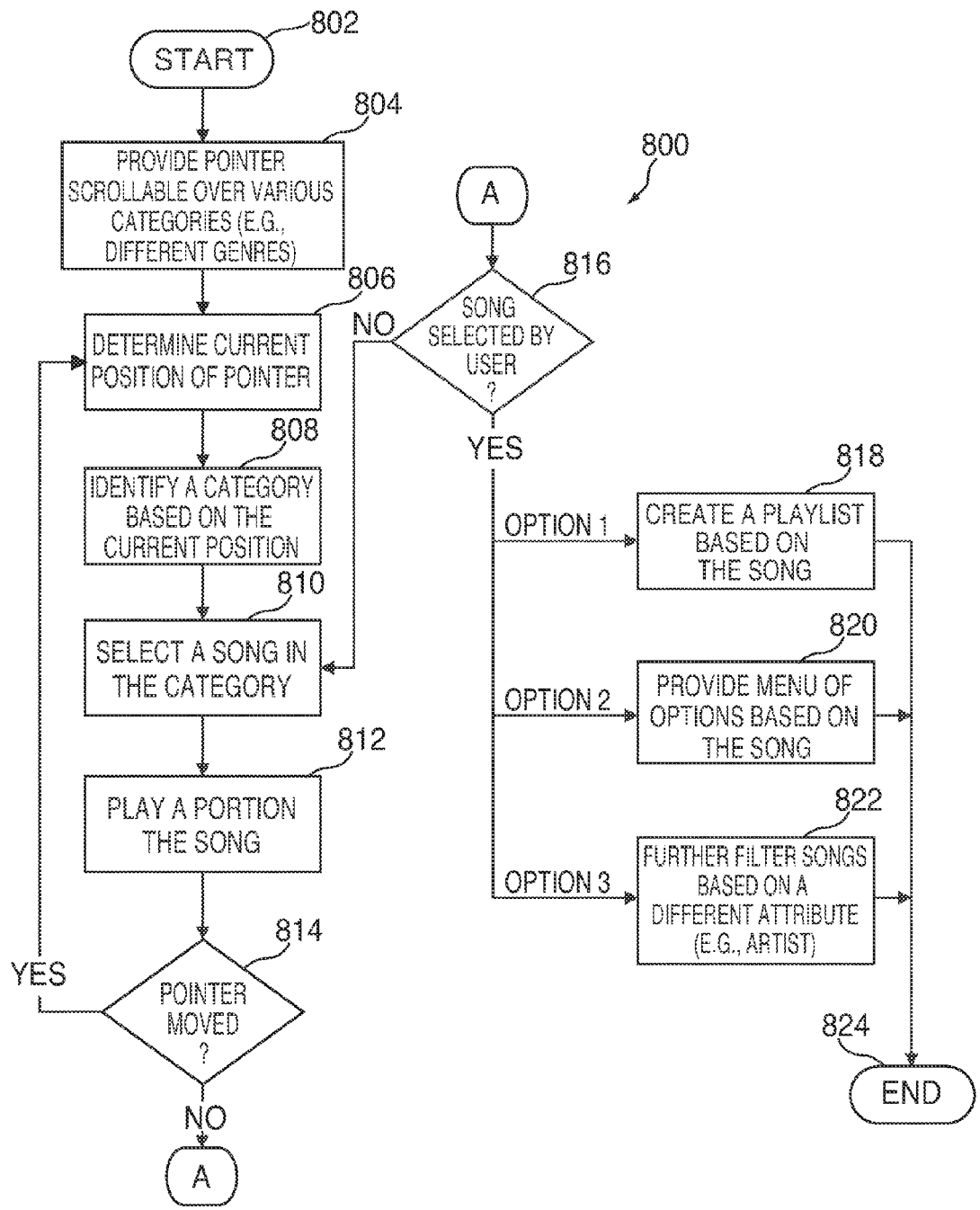
FIG. 8 is a flowchart of an illustrative process for providing a scan preview of music using a user-controllable pointer in accordance with an embodiment of the invention.
Figure 9:
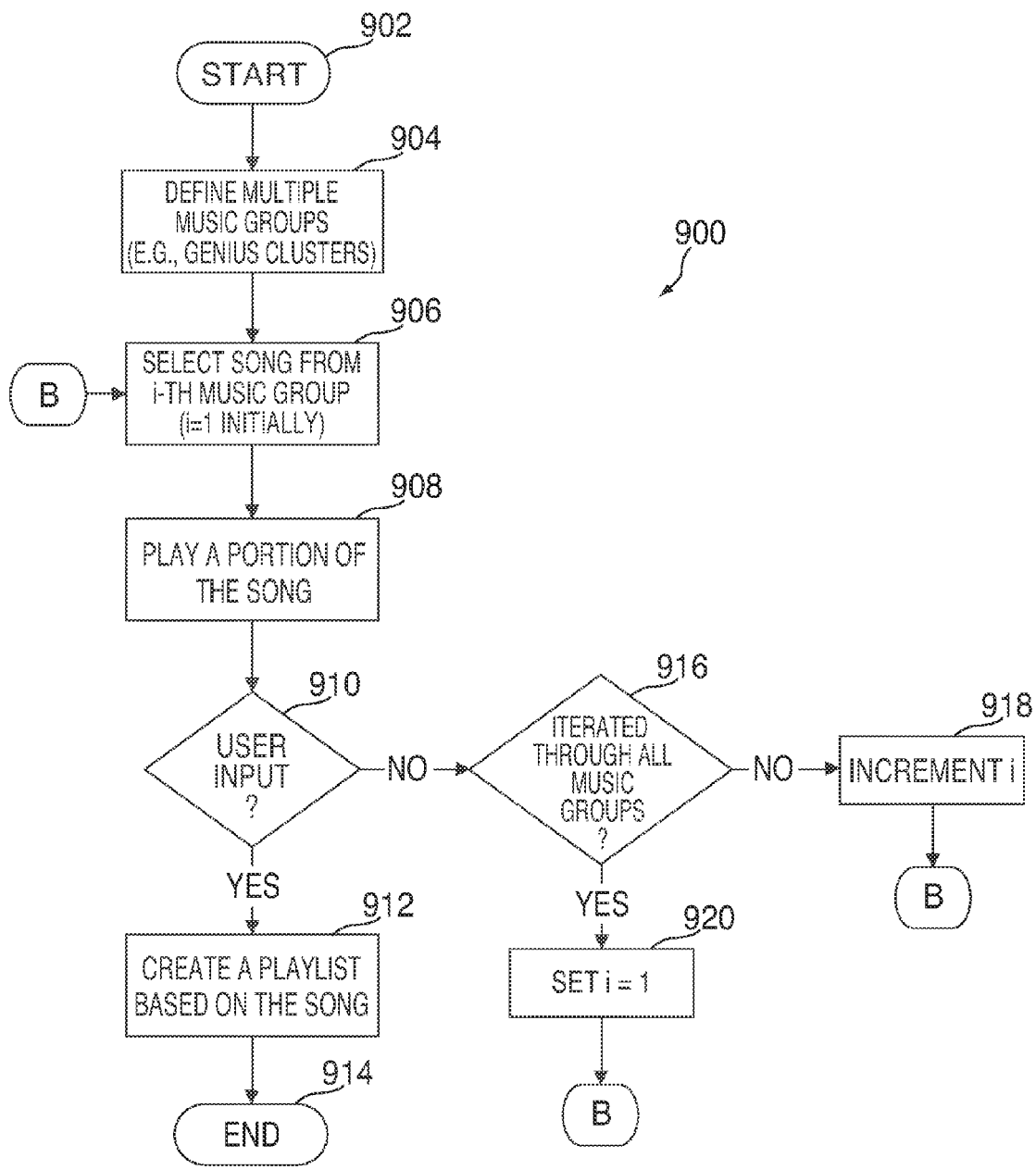
FIG. 9 is a flowchart of an illustrative process for providing a scan preview of music by automatically iterating through portions of songs in different music groups in accordance with an embodiment of the invention.

FIGS. 7-9 are illustrative processes that can be executed by an electronic device (e.g., electronic device 200 of FIG. 2) configured in accordance with the invention. It should be understood that the processes are merely illustrative. Any steps in these flowcharts may be modified, removed, or combined, and any steps may be added, without departing from the scope of the invention.

Turning first to FIG. 7, a flowchart of illustrative process 700 is provided for initiating a scan preview in accordance with an embodiment of the invention. Process 700, in particular, illustrates one way in which different types of scan previews can be initiated by an electronic device. Process 700 starts at step 702 and moves to step 704. At step 704, the electronic device can provide a music main menu, such as a menu similar to menu 600 of FIG. 6. The music main menu can include an option to initiate a scan preview. At step 706, the electronic device determines whether a scan preview has been requested by the user. If a scan preview has been requested, process 700 can move to step 708 or step 710 depending on the particular configuration of the electronic device or on the current settings of the electronic device. At step 708, the electronic device can initiate a seed-generated cluster-based scan preview to identify which music group (e.g., seed-generated cluster) is suitable for the user's current mood. One way in which to implement a seed-generated cluster-based scan preview will be described below in connection with the flow chart of FIG. 9. Alternatively, at step 712, the electronic device can initiate a hierarchical scan preview. One way in which the electronic device can implement a hierarchical scan preview will be described below in connection with the flowchart of FIG. 8. From step 708 or step 712, process 700 can move to step 710 and end.

Returning to step 706, if the electronic device instead determines that a scan preview has not been requested from the music main menu, process 700 continues to step 714. At step 714, the electronic device determines whether the user has selected to filter music by attribute (e.g., using options 620 of FIG. 6), such as by genre, artist, time period (e.g., year released or year downloaded), or song speed (e.g., BPM). If not, process 700 moves to step 710 and ends. Otherwise, process 700 continues to step 716, where the electronic device provides a music submenu for the selected attribute. For example, if the user opts to filter by genre, the electronic device can provide a genre submenu listing different genres.

Then, at step 718, the electronic device can determine whether a scan preview has been requested from the attribute submenu. If no scan preview is requested, process 700 can move to step 710 and end. Otherwise, at step 720, the electronic device can initiate an attribute-based scan preview (e.g., a genre-based from a genre submenu or an artist-based scan preview from an artist submenu). In some embodiments, the electronic device may provide an attribute-based scan preview using some of the steps of the flowchart in FIG. 8, described below. After completing step 720, process 700 may move to step 710 and end.

FIG. 8 is a flowchart of illustrative process 800 for providing a scan preview using a user-controllable pointer. Some of the steps in process 800 may be executed to provide an attribute-based scan preview and may therefore be a more detailed view of step 720 of process 700 (FIG. 7). Some of the steps in process 800 may be executed to provide a hierarchical scan preview and may therefore be a more detailed view of step 712 of process 700.

Process 800 begins at step 802. At step 804, the electronic device can provide a pointer that is scrollable through various categories (e.g., different genres, artists, release date, download date, or song speed (e.g., BPM)). For example, the electronic device can display the categories along a sliding bar, and the pointer may be controllable by the user with respect to the sliding bar. Then, at step 806, the electronic device can determine a current position of the pointer, and at step 808, the electronic device can identify a category based on the current position. For example, the electronic device can determine which category the pointer is currently pointed to along the sliding bar.

Process 800 can then continue to step 810, where the electronic device selects a song in the identified category. In some embodiments, the song may be selected at random (e.g., using a shuffle feature). Then, at step 812, the electronic device may play a portion of the song. The portion may be selected to be representative of the entire song, or may, for example, be a distinguishable or most famous part of the selected song.

Continuing to step 814, the electronic device can determine whether the user-controllable pointer has been moved by the user. If so, process 800 can return to step 806 so that the electronic device can determine the new current position of the pointer. The electronic device may then, at step 808, identify that the category for the new current position is the same or different from the previously selected category. The category may be the same, for example, if the sliding bar includes multiple positions for the same category, and the user has moved the pointer between two such positions. In this scenario, the song selected at step 810 will be in the same category as the last song played. In some embodiments, the new song may be selected at random so that the new song is not necessarily the next song in the user's music library.

Returning to step 814, if the electronic device determines that the pointer has not be moved by the user, process 800 can continue to step 816. At step 816, the electronic device can determine whether the song playing at step 812 has been selected by the user. If the portion of the selected song completes without being selected by the user, process 800 can return to step 810, and another song in the same category can be chosen. Alternatively, the electronic device may continue to play the song or repeat the same song until the song is selected or until the pointer is moved. Returning to step 816, if the electronic device determines instead that the song playing at step 812 has been chosen by the user, the electronic device can take an action based on the selected song.

Steps 818, 820, and 822 show three different options that the electronic device may take in response to a song selection. The choice of options may be based on the configuration of the electronic device or on the current settings of the electronic device. As one option, at step 818, the electronic device may create a playlist based on the selected song. For example, the electronic device can filter the songs in the user's collection of songs to only those in the same category as the selected song. This option may be used, for example, if the electronic device is executing an attribute-based scan. As another example, the electronic device can use the selected song as a seed for a server to, for example, determine other songs that are suitable to be played with the selected song.

Instead, the electronic device can execute step 820 after the song being previewed is chosen by the user. At step 820, the electronic device can provide a menu of options based on the selected song. For example, the electronic device can provide a list of albums or songs from the same artist as the selected song, which a user can review to identify songs of interest.

As an alternative to step 818 and step 820, the electronic device can execute step 822 and provide the user with the ability to further filter songs based on a different attribute. For example, if the current categories are organized based on different genres, the electronic device can filter the songs down to only those of the selected song's genre. The electronic device can then repeat the steps of process 800 using a different attribute, such as artists in that genre, to further filter the songs based on a particular artist. In some embodiments, the electronic device may execute step 822 when the electronic device is implementing a hierarchical scan preview. After the electronic device executes step 818, step 820, or step 822, process 800 can move to step 824 and end.

Referring now to FIG. 9, a flowchart of illustrative process 900 is shown for providing a scan preview that provides each preview without user input. Process 900 may be one way in which an electronic device can implement the seed-generated cluster-based scan preview of step 708 (FIG. 7), described above.

Process 900 starts at step 902. At step 904, the electronic device can define or identify various music groups. The music groups may be, for example, seed-generated clusters that are defined at a server (e.g., server 102 of FIG. 1) based on processing playlists at a plurality of client devices. The electronic device can then receive information from the server on which songs stored in the electronic device belong in which music group. Each of the music groups may therefore include a subset of the songs stored on the electronic device. In other embodiments of the invention, or depending on how the scan preview is initiated, the electronic device can organize the songs stored on electronic device into different categories, such as by genre, artist, album, etc.

Then, at step 906, the electronic device can select a song from a first one of the music groups. The song can be selected at random so that, for example, any of the songs in that music group can be selected for previewing. At step 908, the electronic device can play a portion of the selected song. The portion can be any suitable part of the selected song, such as starting at the beginning of the song, or the portion can be representative of the entire song, the most popular part of the song, or a part of the song that is more distinguishable or identifiable about the song. The portion may be of a predetermined length (e.g., 3 seconds, 5 seconds, 10 seconds).

Process 900 can continue to step 910, where the electronic device determines whether a user input has been received while the portion of the song is playing. If a user input is received, the electronic device, at step 912, can create a playlist based on the selected song. For example, in one embodiment, the electronic device can create a playlist that includes some or all of the songs in the music group that the selected song belongs in. If the music groups are based on seed-generated clusters, this may produce a similar effect as seeding the seed-based clustering feature with the selected song, and may be advantageous since it creates a playlist of songs that go well together without requiring the user to take any arduous tasks. Process 900 can then continue to step 914 and end.

Returning to step 910, if the electronic device determines instead that a user input is not received while the portion of the selected song is playing, process 900 moves to step 916. At step 916, the electronic device can determine whether a song from each of the music groups defined at step 904 has been selected and played. If not, the electronic device can move to step 918, which enables the electronic device to provide a preview of the next music group (e.g., a music group yet to be previewed). In particular, after step 918, process 900 may return to step 906, where the electronic device selects a song from the next music group and plays a portion of this song at step 908. In some embodiments, the electronic device may cross-fade between the preview of the song from the first music group and the preview of the song from the next music group to ensure that the transition does not appear too abrupt or unexpected to the user.

By returning to step 906 each time a user input is not received, the electronic device can provide, in succession, a preview of one song from each music group. This way, the user is able to experience a snippet from different music groups until the user identifies a song (and therefore a music group) that is of interest to the user. In some embodiments, the preview of each song may be of the same, predetermined length (e.g., 5 seconds, 10 seconds), and the electronic device may cross-fade each of the song transitions. In this manner, the electronic device can provide a scan preview that automatically and seamlessly progresses between song snippets. This may produce an audio effect similar to using the scan feature of a radio.

Returning to step 916, if the electronic device determines that one song has been selected from each of the music groups, then the user has not yet selected a song even after hearing a preview from every music group (e.g., every seed-generated cluster). In this case, process 900 moves to step 920, allowing the electronic device to again provide a preview from the first music group. In particular, after step 920, process 900 can move back to step 906, where the electronic device can select another song from the first music group. This allows the electronic device to iterate through and provide audio previews from each music group a second time.

Each song selected at step 906 during the second and subsequent iterations may be selected at random. In some embodiments, this involves the electronic device choosing a song that has not yet been played in the scan preview, if possible. This gives the user a second chance or more to experience each music group, potentially allowing the user to find a music group of interest. In some embodiments, the electronic device can continue to iterate through each music group in this manner until a user input is received or until the user terminates the scan preview.

An electronic device operating based on process 900 provides, in each iteration through the music groups, a preview of only one song in each music group. In other embodiments of the invention, the electronic device may provide a preview of multiple songs (e.g., 5, 10, 20 songs) in each music group during each iteration. That is, the electronic device may play multiple songs from the same music group back-to-back before providing previews for songs in another music group.

Figure 10:
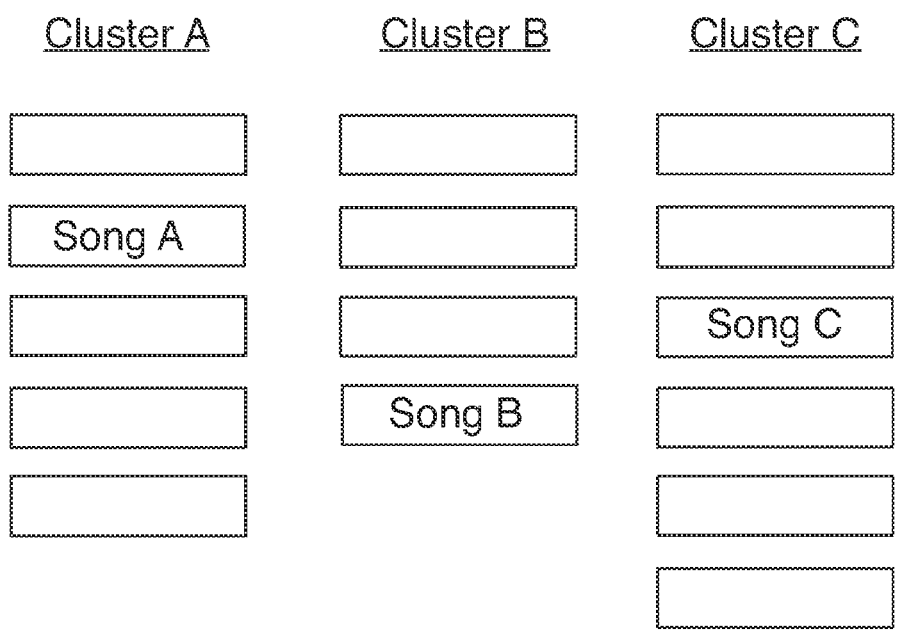
FIGS. 10 and 11 show an example of a scan preview generated using the process of FIG. 9 in accordance with an embodiment of the invention.
Figure 11:
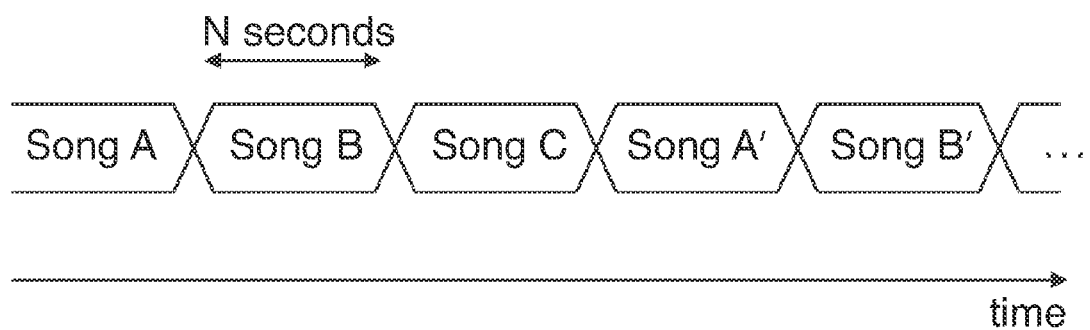

FIG. 10 illustrates the songs that an electronic device executing the steps of process 900 (FIG. 9) might select for a scan preview. In this example, the electronic device can identify three music groups (referred to in FIG. 10 as Clusters A, B, and C), where each box in FIG. 10 represents a song in one of the three music groups. Thus, Cluster A includes five songs (including Song A), Cluster B includes four songs (including Song B), and Cluster C includes six songs (including Song C).

The electronic device can select one song from each music group to play during a first iteration through the music groups. Each song selection can be made from its respective music group at random. In one operating scenario, this random selection may cause the electronic device to select the second song from Cluster A (Song A), the fourth song from Cluster B (Song B), and the third song from Cluster C (Song C). As illustrated in the timing diagram of FIG. 11, the electronic device can play, in succession, Songs A, B, and C for N seconds each (e.g., 3, 5, 10, or 20 seconds), and can use cross-fading to provide smooth transitions between the selected songs.

If no user input is received while snippets of Songs A, B, or C are played, the electronic device can provide a snippet of another song from each of Clusters A, B, and C. The electronic device can select a second song from Cluster A (identified in FIG. 11 as Song A'), which can be any of the five songs in Cluster A other than Song A. The electronic device can select a second song from the four songs in Cluster B (identified in FIG. 11 as Song B') and a second song from the six songs in Cluster C (referred to as Song C'). As illustrated in the timing diagram of FIG. 11, after the first iteration is complete, the electronic device may successively play N seconds each of Songs A', B', and C'.

The electronic device can iteratively play snippets of songs from Clusters A, B, and C in this manner until a user input is received or until the user terminates the scan preview. During the third and subsequent iterations, the electronic device can continue to select different songs from each music group until this is no longer possible. For example, on the fifth iteration through Clusters A, B, and C, the electronic device may reselect Song B from Cluster B, because Cluster B has only four songs to choose from.

The scan previews discussed above in connection with FIGS. 9-11, where the previews of songs progress automatically and a visual interface is not needed, may be beneficial to a user in many scenarios, such as when the user is operating a motor vehicle. While operating a motor vehicle, a user may not be able to devote his or her attention to a visual interface. In these scenarios, a user may employ a car docking system, where the electronic device (e.g., electronic device 200) may be docked on or near the dashboard away from the direct line of sight of the user, and the user may have a knob in which to provide user inputs to the electronic device. Therefore, the interactions that a user can have with the electronic device may be minimal and the display may provide at most, for example, visual queues.

Various embodiments described below provide scan preview features that may be effective in scenarios that limit user interaction, such as in driving scenarios. However, it should be understood that these features may be applied to any other scenario where the user is employing an electronic device for listening to audio.

An electronic device (e.g., electronic device 200 of FIG. 2) may provide a scan preview in a particular mode of operation, which may be referred to sometimes as a "scan preview mode" (or simply "preview mode"). That is, in scan preview mode, the electronic device can provide any of the above-discussed scan previews or the scan previews discussed below in connection with FIGS. 13 and 15. While not in the scan preview mode, the mode of operation for playing audio may sometimes be referred to "play mode." Play mode may be the mode used when the electronic device is playing through a playlist of songs or when a song/album is selected by the user from a menu or from a scan preview, for example.

Figure 12:
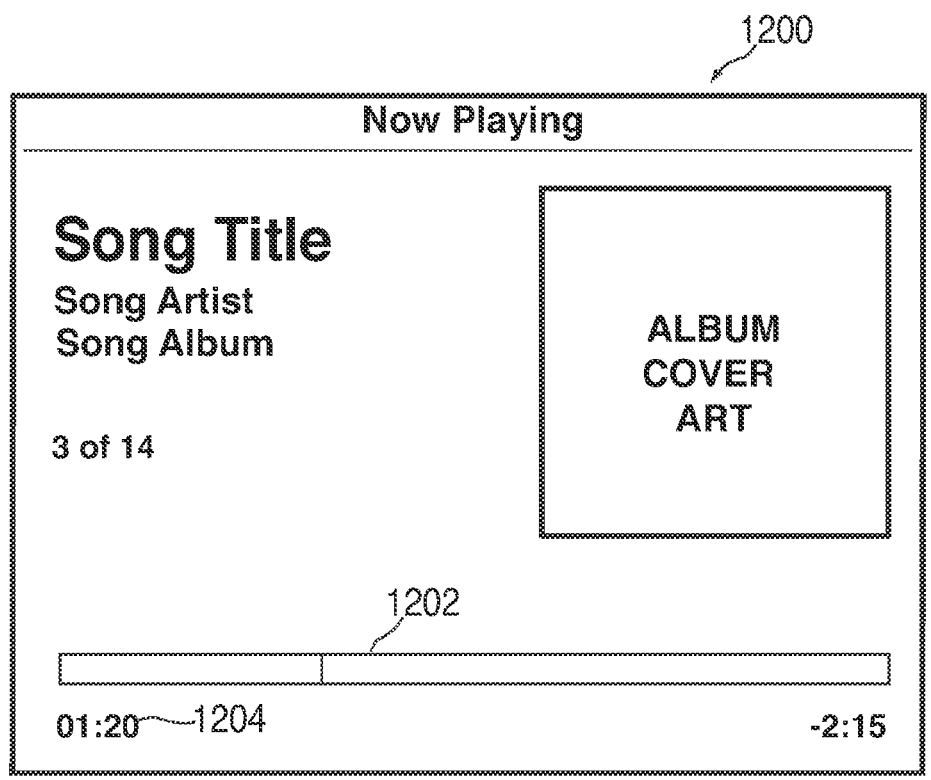
FIG. 12 is an illustrative "Now Playing" display screen that may be provided while an electronic device is operating in play mode in accordance with various embodiments of the invention.

FIG. 12 shows illustrative "Now Playing" display screen 1200, which may be provided by an electronic device (e.g., electronic device 200 of FIG. 2) while playing a song in play mode. Display screen 1200 can provide various information about the song that is currently playing, such as album cover art and the name of the song, artist, and album. Any other metadata associated with the song may also be provided. Display screen 1200 can further include progress bar 1202 and time indicator 1204, which each indicate the length of time into the song that is currently playing. For example, progress bar 1202 currently shows that the song is approximately one third of the way through, and time indicator 1204 currently shows that 1 minute and 40 seconds have elapsed in the song.

In some embodiments, the electronic device may provide seamless transitioning between play mode and scan preview mode, which may be useful in automotive and other scenarios. While playing a song in play mode, the electronic device may switch to scan preview mode in response to a user request. The electronic device may pause the song that is currently playing in play mode and enter into scan preview mode. By pausing the song and keeping track of its pause point, the electronic device may resume playing the paused song in the event that the user does not find a song that he or she would rather play instead. This way, the user can enter into preview mode without worrying about losing his or place in the song, and the user may return to the paused song regardless of the number of songs that are previewed in preview mode during the pause. The ability to resume a song when returning to play mode may be useful in automotive scenarios, because the user may not have the time and attention needed to re-select the song.

For example, a user may choose to enter into scan preview mode at a point in time corresponding to the currently displayed information in display screen 1300. Responsive to the user request, the electronic device may keep track of which song is playing and may save the time stamp of the pause point (i.e., 1:40 into the song). The electronic device may then enter into scan preview mode. For example, the electronic device may present any of display screens 300, 400, or 500 (FIGS. 3-5) and may provide any of the scan preview features described above. If the user exits out of the scan preview mode without selecting a song from the scan preview, the electronic device may transition back to play mode and may resume the paused song at the point of the pause (i.e., at 1:40 into the song). When switching back to play mode, and the electronic device may once again present Now Playing display screen 1200.

If, instead, the user selects one of the previewed songs from the scan preview mode, the electronic device may switch back to play mode and may continue playing the selected song. Thus, there may be a seamless transition back to play mode from scan preview mode regardless of whether the user selects a song from the scan preview mode. When returning to play mode after selecting a new song from the scan preview, the electronic device may provide a display screen similar to display screen 1200, but corresponding to the new song.

In some embodiments, the electronic device may also provide seamless and informative transitioning between different previews in a scan preview. For example, in addition to cross-fading between successive previews, the electronic device may provide a voice over each time that a new preview starts. The voice over can provide any suitable information about the song that is currently starting, such as the name of the song and artist. This way, the user does not need to wait until he or she recognizes the song before deciding whether to continue listening to the song in play mode. The voice over may also allow the previews to each start from a point in the song, such as the beginning of the song, that may not be immediately recognizable to the user. In some embodiments, the cross-fading and the voice over may be coordinated so that a new song does not fade in too fast and drown out the voice over.

In some embodiments, an electronic device (e.g., electronic device 200 of FIG. 2) may provide a multi-directional interface for controlling a scan preview. In these embodiments, the electronic device may receive horizontally-directed and vertically-directed user inputs to affect different aspects of the scan preview. This can give the user a significant amount of control over the progression of the scan preview.

For example, the electronic device may provide an attribute-based scan preview (i.e., where previews are organized and progress by genre, by artist, by album, etc.). In response to a vertically-directed user input, the electronic device may change the attribute that is used to organize the scan preview. For example, if the electronic device is providing a genre-based scan preview, an upwardly-directed user input may cause the electronic device to switch to an artist-based scan preview and a downwardly-directed user input may cause the electronic device to instead switch to an album-based scan preview. As another example, an upwardly-directed input may cause the electronic device to switch a folder-based scan preview in which various folders of the electronic device can be scanned. This way, the user can decide on the best way to locate a particular song, and the user can easily inform the electronic device of the decision.

Once the user has decided on an attribute in which to organize the scan preview (e.g., by artist, by genre, by album, etc.), the user may use horizontally-directed user inputs to move through the categories of the attribute. For example, if the user has selected a genre-based scan preview and the electronic device is currently cycling through previews of hip hop songs, a rightward user input may cause the electronic device to start cycling through previews of R&B songs and a leftward user input may cause the electronic device to start cycling through previews of pop songs.

Figure 13:
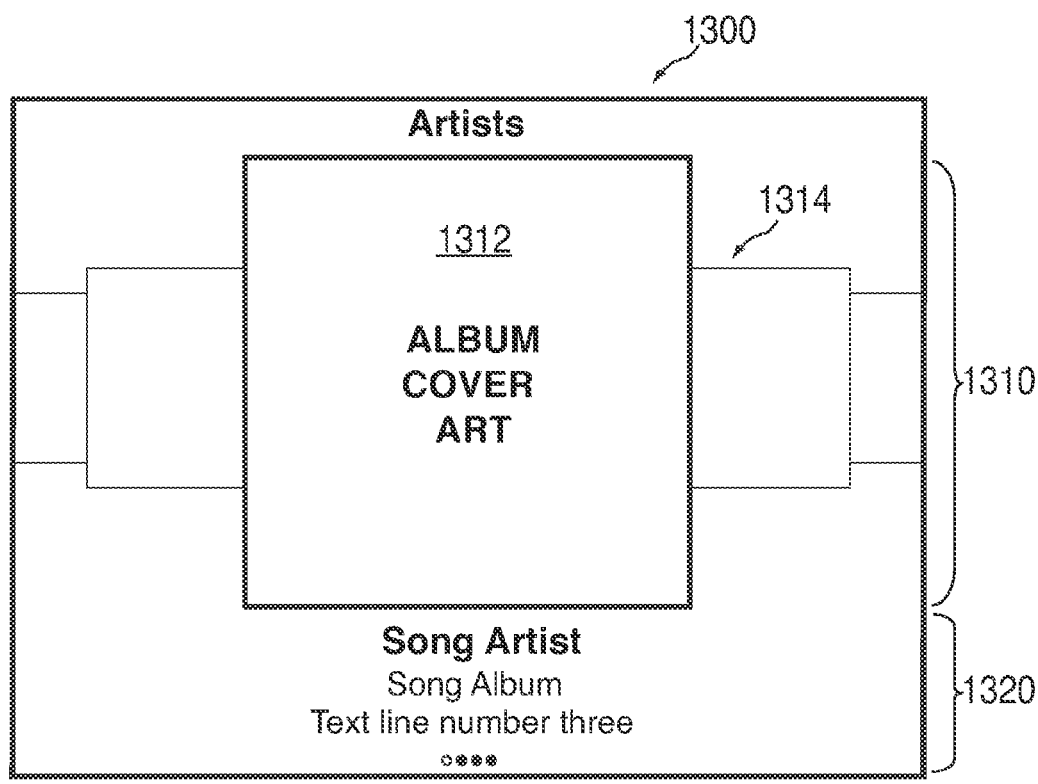
FIG. 13 is an illustrative display screen of a visual interface that may be provided while an electronic device is operating in scan preview mode in accordance with various embodiments of the invention.

FIG. 13 shows illustrative display screen 1300, which the electronic device may present when providing a multi-directional interface for a scan preview. Here, an artist-based scan preview may currently be selected. In particular, display screen 1300 may be provided when songs of a particular artist (e.g., U2) are being provided as previews, and a horizontal user input can be used to change the artist whose songs are being previewed.

Display screen 1300 can include graphical region 1310 and information region 1320. Graphical region 1310 can present multiple album covers, including album cover 1312 corresponding to an artist whose songs are currently being previewed. For example, the electronic device may provide album cover 1312 for a particular artist in a prominent, central position while automatically cycling through songs associated with the particular artist or album. Information region 1320 may provide information on the song currently being previewed and/or on the artist whose songs are being cycled through. Information region 1320 may also display any other suitable information.

Graphical region 1310 can further include additional album covers 1314 in the background, such as in a manner that allows foreground album cover 1312 to appear up close compared to background album covers 1314. Background album covers 1314 may be associated with other artists whose songs may be previewed in response to a horizontally-directed user input. For example, responsive to a leftward user input, the electronic device may begin automatically cycling through songs by the artist whose album cover is to the left of album cover 1312. The electronic device may also shift the album covers displayed in graphical region 1310 so that the newly-selected artist's album cover is displayed in place of album cover 1312 as the album cover in the forefront. Updating a graphical region, such as graphical region 1310, so that the display appears to shift in a given direction may be referred to as "rotating" the display screen.

In response to receiving a vertically-directed user input, the electronic device may rotate graphical region 1310 vertically. For example, the album covers currently presented on graphical region 1310 may be moved upward/downward and off of the screen. In its place, the electronic device may shift in another set of album covers associated with a different attribute (e.g., the genre attribute). This way, the electronic device can provide, for example, a genre-based scan preview and the new album covers provided in graphical region 1310 may be ordered based on genre (e.g., in alphabetical order for each particular genre).

While a horizontal or vertical input has not been received, the electronic device may provide and cycle through previews using any suitable approach, such as using any of the above-described approaches. For example, in some embodiments, the electronic device may automatically cycle through the songs by playing each song for a predetermined amount of time (e.g., 5, 10, 15, 20 seconds, etc.) before moving on to the next song. In some embodiments, the electronic device may play each preview from the beginning of the song. This way, if the user chooses to continue playing a particular song in play mode, as described above, the electronic device can play the entire song without interruption or without having to start the song over again. It should be understood, however, that other approaches for providing previews may be used instead.

Display screen 1300, and the associated scan preview provided with display screen 1300, may include any of the features described above in connection with FIGS. 3, 4, and 5, and vice versa. For example, in some embodiments, display screen 1300 may include a sliding bar similar to those of FIGS. 3, 4, and 5 instead or in addition to information region 1320. Similarly, display screens 300, 400, and 500 (FIGS. 3-5) may each include an information region similar to information region 1320 of FIG. 13.

Figure 14:
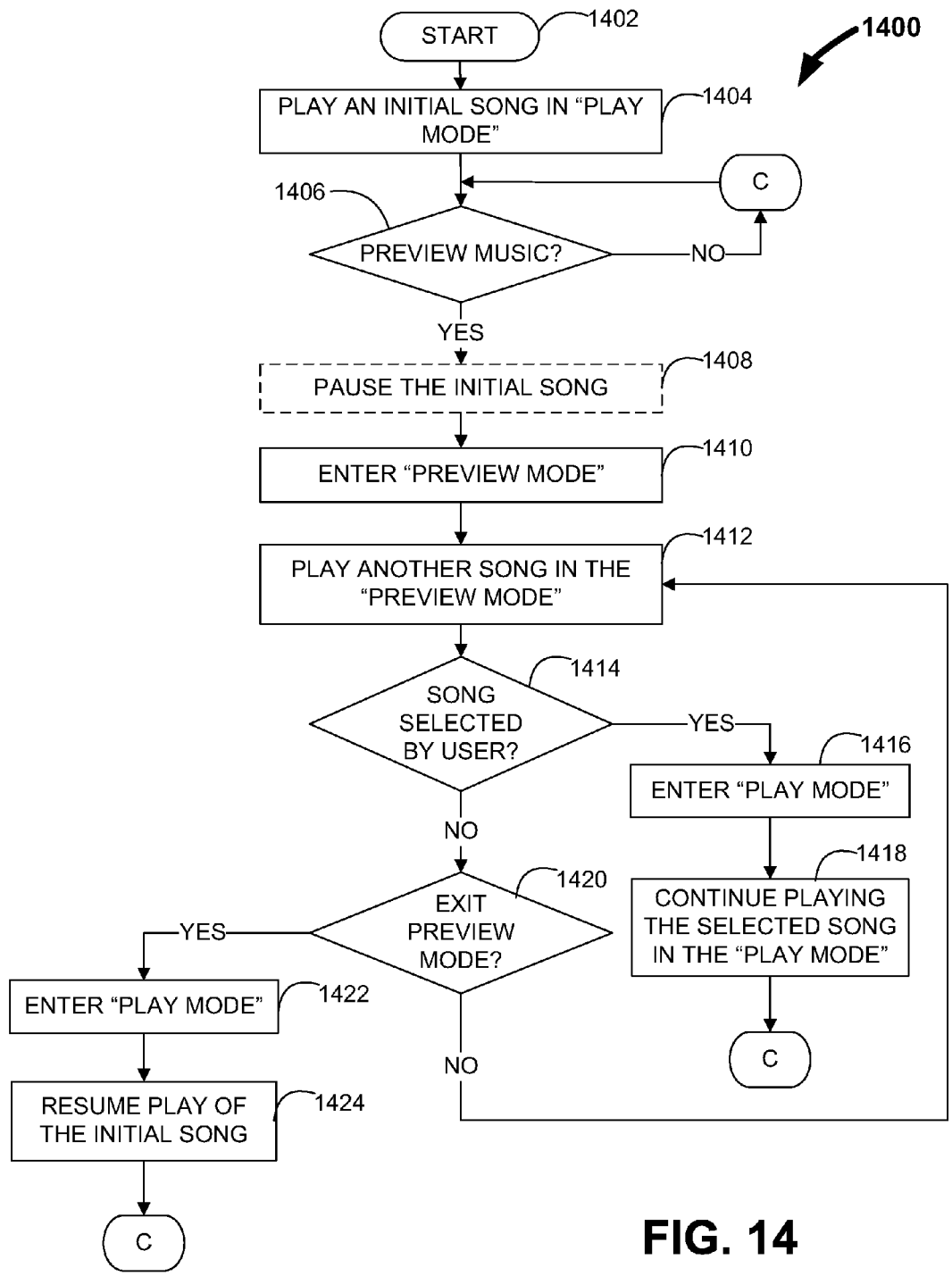
FIG. 14 is a flowchart of an illustrative process for seamlessly transitioning between play mode and preview mode in accordance with various embodiments of the invention.
Figure 15:
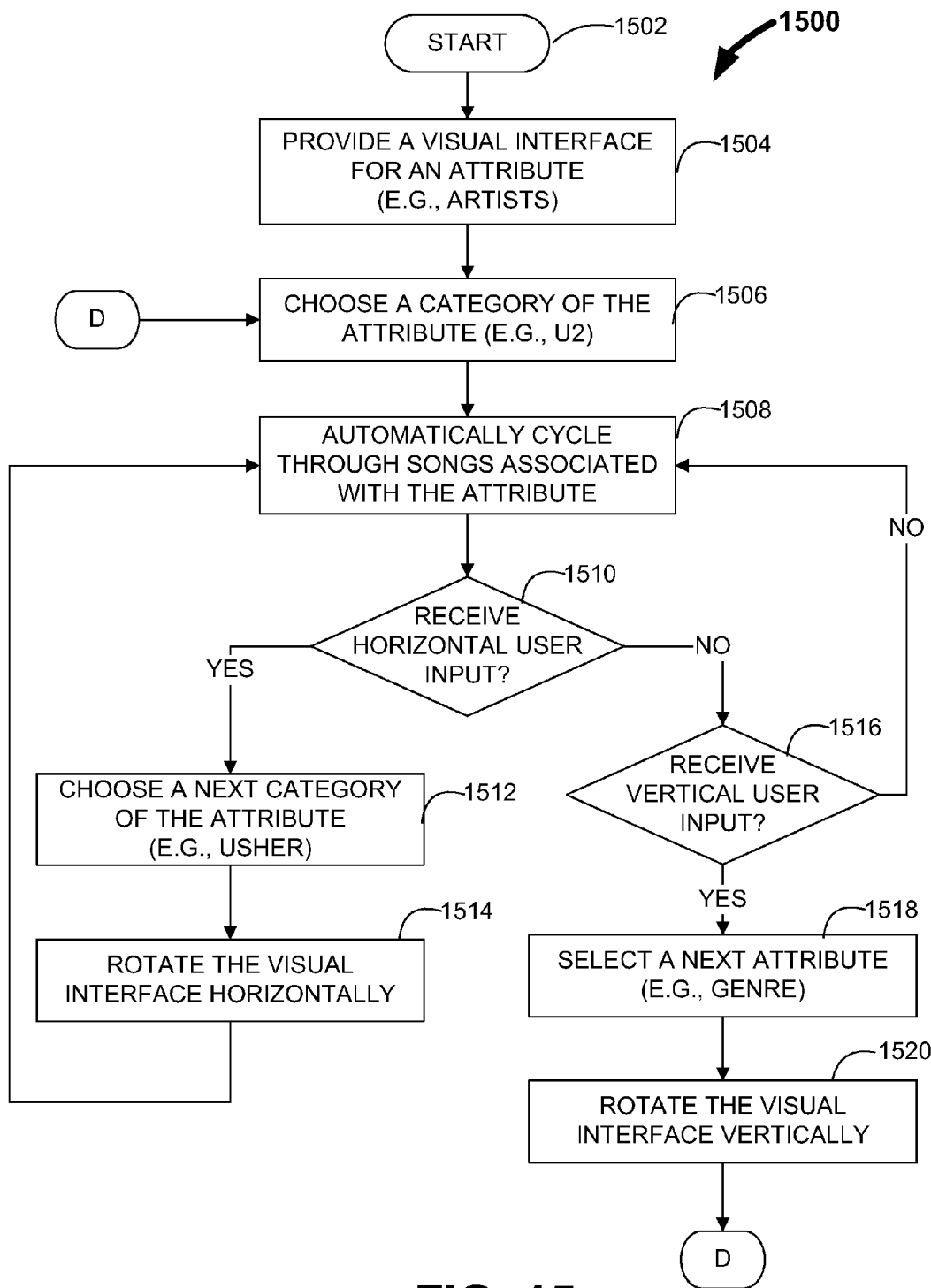
FIG. 15 is a flowchart of an illustrative process for providing a multi-directional visual interface during a scan preview in accordance with various embodiments of the invention.

FIGS. 14 and 15 are illustrative processes that can be executed by an electronic device (e.g., electronic device 200 of FIG. 2) configured in accordance with the invention. It should be understood that the processes are merely illustrative. Any steps in these flowcharts may be modified, removed, or combined, and any steps may be added, without departing from the scope of the invention.

Turning first to FIG. 14, a flowchart of illustrative process 1400 is shown for providing seamless transitioning between play mode and scan preview mode. Process 1400 may begin at step 1402. At step 1404, the electronic device may play an initial song in play mode. If, at step 1406, the electronic device determines that the user has requested a scan preview, process 1400 may continue to step 1408. At step 1408, the electronic device may pause the initial song. Pausing the initial song may involve saving the pause point (i.e., time stamp) of the song so that the electronic device may be able to resume the song at the same point. In some embodiments, step 1408 can be optional.

Then, at step 1410, the electronic device may enter into scan preview mode, where the electronic device can provide previews of any number of songs. In particular, at step 1412, the electronic device can provide a preview of a first song in scan preview mode. The preview may be played for a predetermined amount of time (e.g., 5, 10, 15, or 20 seconds, etc.) or until the user requests that a different song be previewed. The electronic device can determine whether, during the time that the song is previewed, the user selected the song. If, at step 1414, the electronic device determines that the song was selected, process 1400 can transition back to play mode at step 1416. In play mode, the electronic device can continue playing the selected song at step 1418. Because the song may be continued even when transitioning from preview to play mode, there may be no break in audio during the transition. Thus, the transition from preview to play mode may be seamless to the user. Finally, from step 1418, process 1400 may return to step 1406 in the event that the user wants to initiate a scan preview once again.

Returning to step 1414, if a song being previewed is not selected by the user, process 1400 can continue to step 1420. At step 1420, the electronic device may determine whether the user has decided to exit out of scan preview mode. If not, process 1400 can return to step 1412, and the electronic device can play a different song as a part of the scan preview. If the user has decided to exit out of the scan preview mode, the electronic device may enter back into play mode at step 1422 from preview mode. In play mode, the electronic device may resume play of the initial song that was paused at step 1408. In particular, the electronic device may identify the pause point of the initial song (e.g., via a saved time stamp) and may play the initial song starting at the pause point. To enable seamless transitioning, the electronic device may cross-fade between the last song that was previewed in scan preview mode and the initial song. In some embodiments, the electronic device may also add a voice over that provides information about the initial song, such as the name of the song, artist, and album. Process 1400 may then return to step 1406 in the event that the user wants to initiate a scan preview once again.

Referring now to FIG. 15, a flowchart of illustrative process 1500 is shown for providing a multi-directional visual interface for controlling a scan preview. Process 1500 may begin at step 1502. At step 1504, the electronic device may provide a visual interface for an attribute. For example, for an artist attribute, the electronic device may provide a visual interface similar to display screen 1300 of FIG. 13. Then, at step 1506, the electronic device may choose a category within the attribute, such as a particular artist (e.g., U2). This choice can affect the information presented in the visual interface, such as which album cover gets displayed in the forefront of FIG. 13.

Then, at step 1508, the electronic device may cycle through songs associated with the attribute chosen at step 1506. For example, the electronic device may play, in succession, previews of songs by U2. In some embodiments, the electronic device may cross-fade between each of the previews and may add voiceover when starting each preview to introduce the song. If, at step 1510, a horizontal user input is received, process 1500 can move to step 1512. At step 1512, the electronic device may choose another category of the same attribute. For example, the electronic device may continue providing an artist-based scan preview, and may switch from U2 to another artist. Since the artists may be arranged alphabetically, whether the horizontal input is left or right may cause the electronic device to move up or down alphabetically when selecting the next artist. At step 1514, the electronic device may rotate the visual interface horizontally, which may be a rightward or leftward rotation based on the direction of the user input.

Returning to step 1510, if a horizontal input is not received, the electronic device may determine at step 1516 whether a vertical user input has been received. If not (i.e., when neither a horizontal input or a vertical input has been received), process 1500 may return to step 1508 and the electronic device may continue cycling through previews of songs with the current attribute (e.g., U2 songs). If a vertical user input is received, process 1500 may continue to step 1518. At step 1518, the electronic device may select another attribute, such as the genre attribute to begin providing a genre-based scan preview. To show this on the visual interface, the electronic device may rotate the visual interface vertically at step 1520. The next attribute selected at step 1518 and the direction of rotation at step 1520 may be based on whether the user input was up or down. After step 1520, process 1500 can return to step 1506 a category for the new attribute (e.g., the attribute selected at step 1518) can be chosen.

Once again, the processes discussed above are intended to be illustrative and not limiting. Persons skilled in the art could appreciate that steps of the process discussed herein can be omitted, modified, combined, or rearranged, and any additional steps can be performed without departing from the scope of the invention. For example, in some embodiments, confirmations steps such as steps 1510 and 1516 can be reversed in order, such that process 1500 first checks for a vertical input before checking for a horizontal input.

It will be apparent to those of ordinary skill in the art that methods involved in the invention may be embodied in a computer program product that includes a machine readable and/or usable medium. For example, such a computer usable medium may consist of a read-only memory device, such as a CD ROM disk or conventional ROM device, or a random access memory, such as a hard drive device or a computer diskette, or flash memory device having a computer readable program code stored thereon.

The above-described embodiments of the invention are presented for purposes of illustration and not of limitation.

What is claimed is:

1. A method of seamlessly transitioning between a play mode and a preview mode in an electronic device, the method comprising:
    playing an initial audio element in the play mode;
    while playing the initial audio element, receiving a first user request to enter into the preview mode;
    responsive to receiving the first user request:
        pausing the playing of the initial audio element;
        automatically playing, in succession, a plurality of audio previews of a plurality of other audio elements in the preview mode, wherein each audio preview comprises an audio portion of a different one of the other audio elements;
        receiving a second user request to exit the preview mode; and
        responsive to receiving the second user request, resuming play of the initial audio element in the play mode.

2. The method of claim 1, further comprising:
    receiving, during the automatically playing, a user selection of a particular other audio element corresponding to a currently playing audio preview; and
    responsive to receiving the user selection:
        entering the play mode; and
        continuing to play, without interruption, the selected other audio element in the play mode.

3. The method of claim 1, wherein the automatically playing comprises:
    starting each of the other audio elements from the beginning; and
    switching to a next audio element in the succession after a predetermined amount of time has elapsed.

4. The method of claim 1, wherein the automatically playing comprises cross-fading between each of the other audio elements in the succession.

5. The method of claim 1, wherein the automatically playing comprises playing a voiceover when switching to a new audio element in the succession, wherein the voiceover provides metadata associated with the new audio element.

6. The method of claim 1, wherein the pausing comprises saving a time stamp of when the initial audio element is stopped, and wherein the resuming comprises starting the initial audio element at a point corresponding to the time stamp.

7. The method of claim 1, further comprising:
    providing a now-playing display screen when operating in the play mode; and
    providing a scan preview display screen when operating in the preview mode.

8. A non-transitory machine-readable media for seamlessly transitioning between a play mode and a preview mode in an electronic device, the machine-readable media comprising machine-readable instructions recorded thereon for:

playing an initial audio element in the play mode;

while playing the initial audio element, receiving a first user request to enter into the preview mode;

responsive to receiving the first user request:

pausing the playing of the initial audio element;

automatically playing, in succession, a plurality of audio previews of a plurality of other audio elements in the preview mode, wherein each audio preview comprises an audio portion of a different one of the other audio elements;

receiving a second user request to exit the preview mode; and responsive to receiving the second user request, resuming play of the initial audio element in the play mode.

9. The non-transitory machine-readable media of claim 8, the machine-readable media further comprising machine-readable instructions recorded thereon for:

receiving, during the automatically playing, a user selection of a particular other audio element corresponding to a currently playing audio preview; and responsive to receiving the user selection:

entering the play mode; and continuing to play, without interruption, the selected other audio element in its entirety in the play mode.

10. The non-transitory machine-readable media of claim 8, wherein the machine-readable instructions for the automatically presenting comprises machine-readable instructions for:

starting each of the other audio elements from the beginning; and switching to a next audio element in the succession in response to a user input.

* * * * *